(12) United States Patent
Weiss et al.

(10) Patent No.: US 10,951,086 B2
(45) Date of Patent: Mar. 16, 2021

(54) ELECTRIC DEVICE WITH WIRING GUIDE ELEMENT

(71) Applicants: Tyco Electronics Belgium EC BVBA, Oostkamp (BE); TE Connectivity Germany GmbH, Bensheim (DE)

(72) Inventors: Alexander Weiss, Keiem (BE); Koen Van Reybrouck, Oostkamp (BE); Tom Ocket, Torhout (BE); Steven Van Nimmen, Drongen (BE); Pieter-Jan Ossieur, Ghent (BE); Michael Siotto, Heidelberg (DE)

(73) Assignees: TYCO ELECTRONICS BELGIUM EC BVBA, Oostkamp (BE); TE CONNECTIVITY GERMANY GMBH, Bensheim (DE)

( * ) Notice: Subject to any disclaimer, the term of this patent is extended or adjusted under 35 U.S.C. 154(b) by 372 days.

(21) Appl. No.: 15/968,892

(22) Filed: May 2, 2018

(65) Prior Publication Data

US 2018/0323677 A1 Nov. 8, 2018

(30) Foreign Application Priority Data

May 4, 2017 (EP) .................................... 17169573

(51) Int. Cl.
*H02K 11/21* (2016.01)
*H02K 24/00* (2006.01)
(Continued)

(52) U.S. Cl.
CPC ............. *H02K 5/225* (2013.01); *H02K 3/522* (2013.01); *H02K 11/21* (2016.01); *H02K 24/00* (2013.01); *H02K 5/10* (2013.01); *H02K 2203/06* (2013.01)

(58) Field of Classification Search
CPC . H02K 3/38; H02K 3/50; H02K 11/21; H02K 24/00; H02K 2203/06; H02K 5/22;
(Continued)

(56) References Cited

U.S. PATENT DOCUMENTS 9,136,748 B2 9/2015 Ochiai
2012/0262015 A1* 10/2012 Shin ....................... H02K 3/522
310/71

FOREIGN PATENT DOCUMENTS

DE 4321540 A1 1/1995
EP 1191665 A1 * 3/2002
(Continued)

OTHER PUBLICATIONS

Forudate (JP 57025133 A) English Translation (Year: 1982).*
(Continued)

*Primary Examiner* — Tulsidas C Patel
*Assistant Examiner* — Robert E Mates (57) ABSTRACT

An electric device comprises an internal wiring and a housing. The housing includes a base and a cover. The base has a wiring guide member and a terminal area in which the internal wiring is connected to an outside electric conductor. The cover has a trough section into which the terminal area at least partly extends. The trough section has a trough wall which abuts the base to form a sealing surface. The wiring guide member supports the internal wiring at a position spaced apart from the sealing surface and opposite the trough wall and the internal wiring extends over the trough wall and into the trough section to the terminal area.

18 Claims, 6 Drawing Sheets

(51) Int. Cl.
*H02K 5/10* (2006.01)
*H02K 5/22* (2006.01)
*H02K 3/52* (2006.01)

(58) Field of Classification Search
CPC ............ H02K 3/46; H02K 3/34; H02K 3/345;
H02K 11/225
USPC .................................................. 310/71, 68 B
See application file for complete search history.

(56) References Cited

FOREIGN PATENT DOCUMENTS

| JP | 57025133 A | * | 2/1982 | ............. H02K 5/225 |
|---|---|---|---|---|
| JP | S5725133 A | | 2/1982 | |
| JP | H09327164 A | | 12/1997 | |
| JP | 2005318726 A | | 11/2005 | |

OTHER PUBLICATIONS

Rode (EP 1191665 A1) English Translation (Year: 2002).*
Abstract of EP0632564A1, corresponding to DE4321540A1, dated Jan. 19, 1995, 2 pages.
Extended European Search Report, EP108661, dated Oct. 4, 2017, 9 pages.
Abstract of JPH09327164A, dated Dec. 16, 1997, 1 page.
Abstract of JP2005318726A, dated Nov. 10, 2005, 1 page.
European Search Report, European Application No. 17169573.7-1201, European Filing Date Nov. 12, 2019.

* cited by examiner

ELECTRIC DEVICE WITH WIRING GUIDE ELEMENT

CROSS-REFERENCE TO RELATED APPLICATION

This application claims the benefit of the filing date under 35 U.S.C. § 119(a)-(d) of European Patent Application No. 17169573.7, filed on May 4, 2017.

FIELD OF THE INVENTION

The present invention relates to an electric device and, more particularly, to an electric device with a protected internal wiring.

BACKGROUND

Electric devices such as motors or position measurement devices like resolvers often need to withstand harsh operational environments, for instance when operated in transmission oil, which is highly corrosive at increased operation temperatures. In the prior art, a terminal area of such electric devices is covered with a cover. The cover has a trough section into which a terminal area of the electric device extends. The internal wiring of the electric device is connected to at least one outside electric conductor in the terminal area; an electric contact of the electric device in the terminal area need to be protected from the operational environment.

Certain operational environments require further protection of the terminal area, which may be performed by potting the trough section or filling the trough section with a filling medium. During and/or after assembly of the electric device, the internal wiring, which may be embodied as a plurality of wires wound around a coil, is led from a potting free area into a potting area. The cover part, however, may touch the internal wiring during and/or after assembly, which causes stress and damage to the internal wiring.

SUMMARY

An electric device comprises an internal wiring and a housing. The housing includes a base and a cover. The base has a wiring guide member and a terminal area in which the internal wiring is connected to an outside electric conductor. The cover has a trough section into which the terminal area at least partly extends. The trough section has a trough wall which abuts the base to form a sealing surface. The wiring guide member supports the internal wiring at a position spaced apart from the sealing surface and opposite the trough wall and the internal wiring extends over the trough wall and into the trough section to the terminal area.

BRIEF DESCRIPTION OF THE DRAWINGS

The invention will now be described by way of example with reference to the accompanying Figures, of which.

DETAILED DESCRIPTION OF THE EMBODIMENT(S)

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

Figure 1:
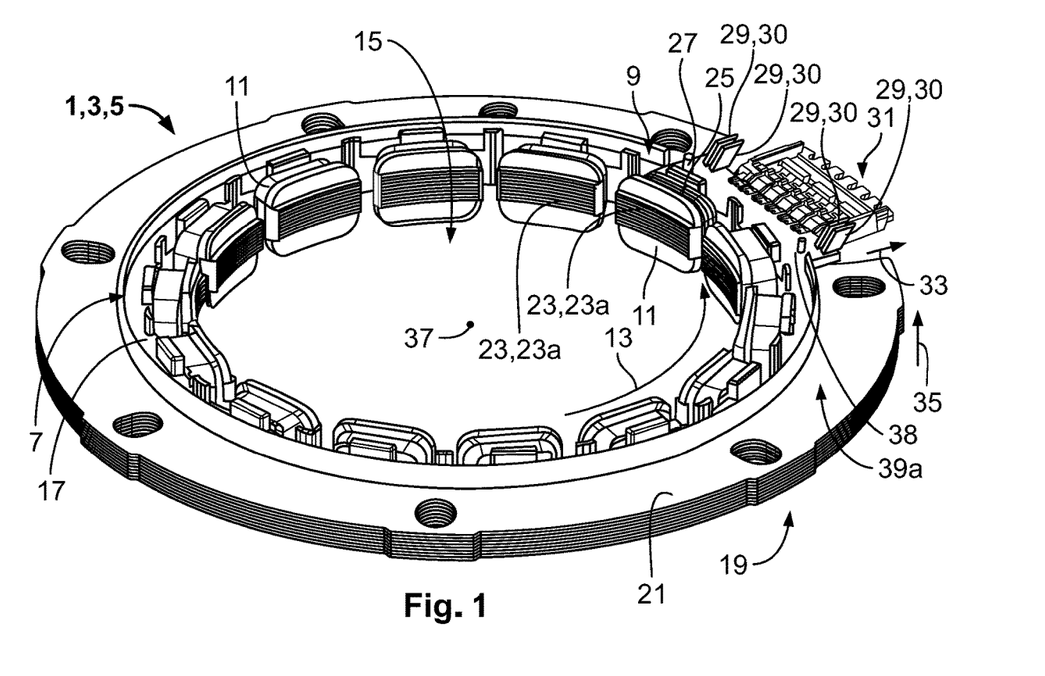
FIG. 1 is a perspective view of an electric device according to an embodiment.

An electric device 1 according to an embodiment is shown in FIG. 1. In the shown embodiment, the electric device 1 is a resolver 3 for a motor or of a rotational, linear, and/or position measurement device 5. The resolver 3 comprises a housing 7 and an internal wiring 9; the internal wiring 9 is shown as a single coil assembly 11 in FIG. 1. The resolver 3 comprises a plurality of coil assemblies 11 arranged in a circumferential direction 13 at an inner side 15 of a ring-shaped base 17. In other embodiments, the electric device 1 may be any device with internal wiring 9 requiring protection of the wire.

The resolver 3 has a ring-shaped magnetic core 21 as shown in FIG. 1. The core 21 extends from an outer side 19 of the resolver 3 into the base 17. Inward projections 23, also referred to as poles 23a, of the core 21 extend from the outer side 19 into the corresponding coil assemblies 11. The core 21 contains the poles 23a and, in an embodiment, is overmolded with a polymer to form the base 17 and the housing 7.

The internal wiring 9 in the embodiment shown in FIG. 1 has a single wire 25 wound around the coil assembly 11. In an embodiment, the wire 25 is a copper wire with lacquer insulation and a diameter in the range of 0.1 to 0.2 mm. The internal wiring 9 may include a plurality of copper wires 25 wound around a plurality of coil assemblies 11 of an electric component, wherein the coil assemblies 11 are arranged circumferentially around the center of the base 17. The number of coil assemblies 11 may correspond to the number of wires 25 of the internal wiring 9.

The single wire 25 is wound around the inward projection 23 of the magnetic core 21. The wire 25 is led to an auxiliary wiring guide member 27 and subsequently to two wiring guide members 29 and towards a terminal area 31. The base 17 includes a main section 38 and the terminal area 31. In an embodiment, the terminal area 31 protrudes from the main section 38. In another embodiment, more than one terminal area 31 may be provided in the electric device 1. The wiring guide members 29 are protrusions 30 protruding from the base 17.

The terminal area 31, as well as the four wiring guide members 29, extend from the base 17 partially in a radial direction 33 and partially in a vertical direction 35 shown in FIG. 1. The vertical direction 35 is oriented essentially perpendicular to the radial direction 33 and the circumferential direction 13. One possible radial direction 33 is shown in FIG. 1, which is representative of a plurality of radial directions 33 extending from the center 37 of the ring-shaped base 17 and outward toward the ring-shaped base 17.

A cover side 39a of the resolver 3 is shown in FIG. 1. The terminal area 31 and the wire guide members 29 are disposed on the cover side 39a.

Figure 2:
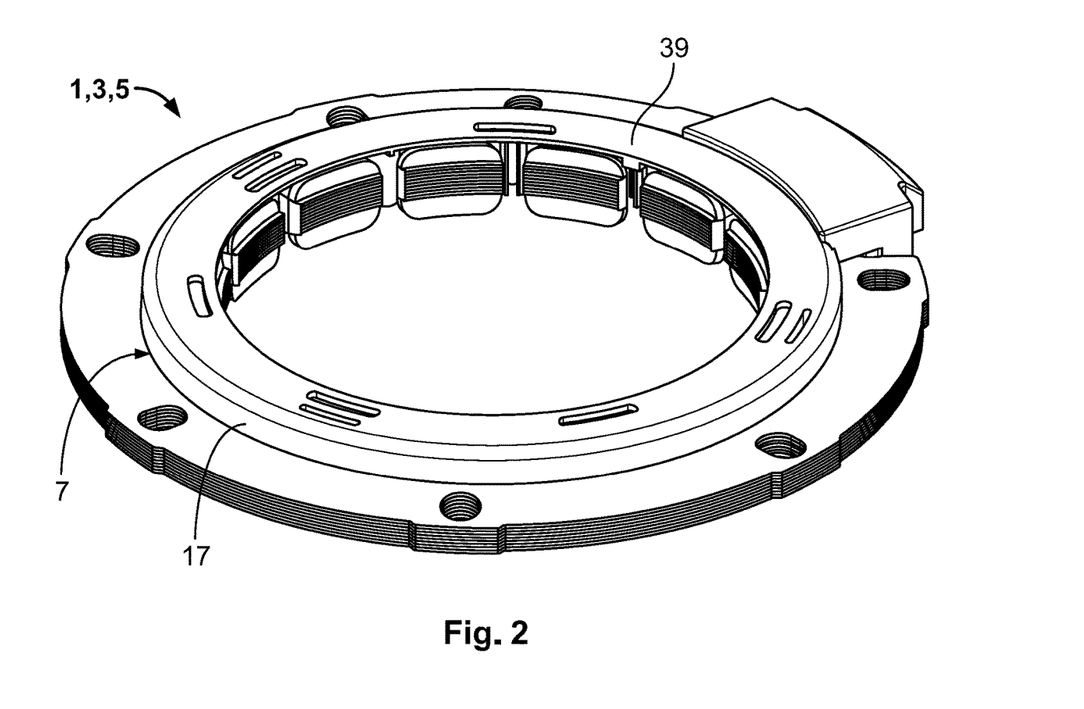
FIG. 2 is a top perspective view the electric device of FIG. 1 with a cover.

The resolver 3, as shown in FIG. 2, includes a cover 39 attached to the housing 7 at the base 17. The cover 39 covers the terminal area 31, protecting the terminal area 31 from environmental influences.

Figure 3A:
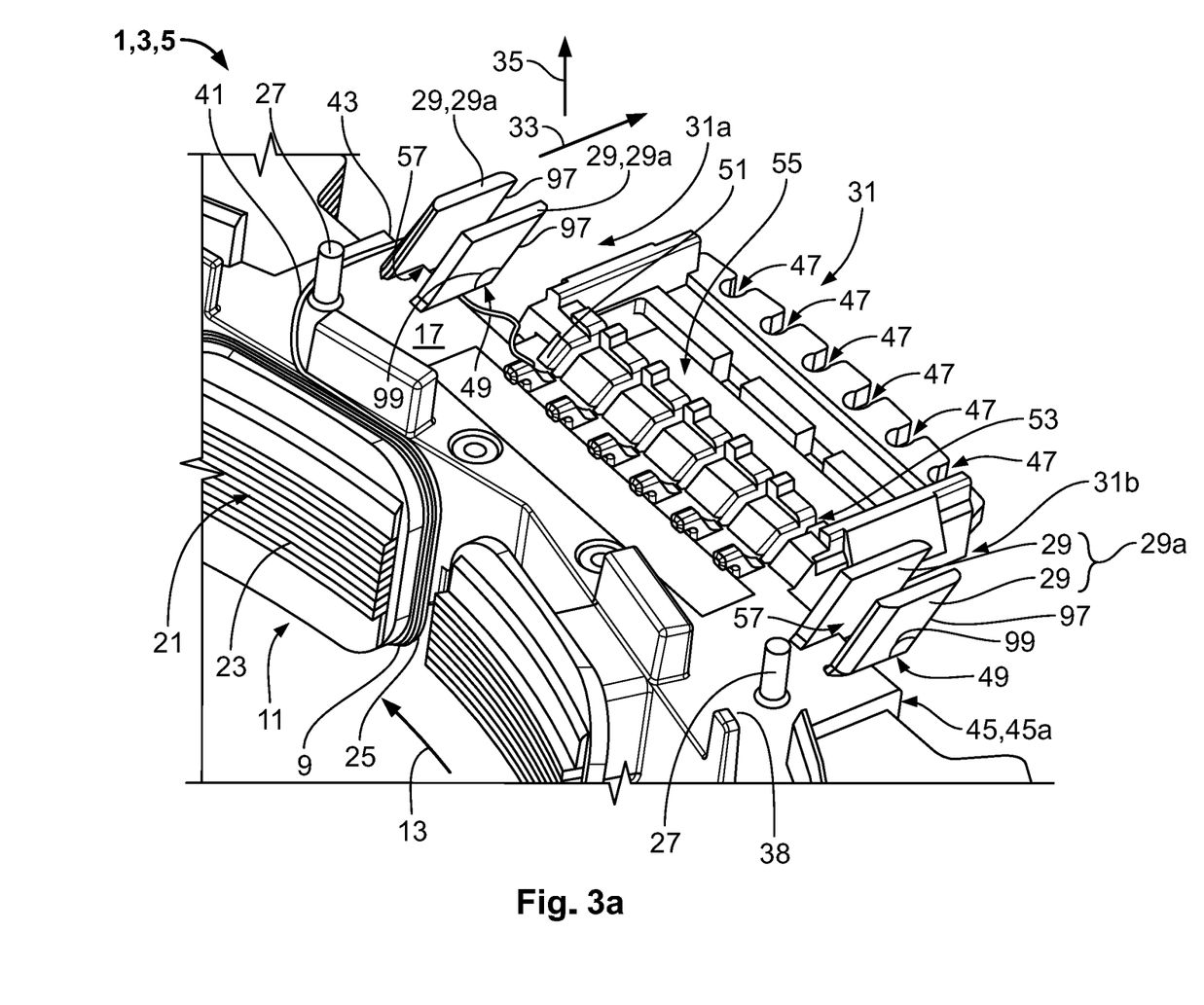
FIG. 3A is a perspective view of a terminal area of the electric device of FIG. 1.

As shown in FIG. 3A, the wire 25 is wound around an inward projection 23 of the magnetic core 21. A wire end 41 extends away from the coil assembly 11 on the base 17, is wound around an auxiliary wiring guide member 27, and is redirected essentially in the radial direction 33 towards an edge 43 of the base 17. The edge 43 of the base 17 is oriented essentially perpendicular to the extension of the wire end 41 after the wire end 41 passes the auxiliary wiring guide member 27.

The edge 43, as shown in FIG. 3A, includes a partial side wall 45. In an embodiment, the partial side wall 45 is a partially circumferentially embodied and bent surface facing into the radial direction 33. In the embodiment shown in FIG. 3A, the partial side wall 45 is a planar side wall whose center is oriented essentially perpendicular to the radial direction 33. The side wall 45 may have other shapes in other embodiments.

The wire end 41 is supported at a supporting surface 49 as shown in FIG. 3A. The supporting surface 49 is embodied at each of the wiring guide members 29 and faces opposite the vertical direction 35. After passing the supporting surfaces 49, the wire end 41 extends partially in the vertical direction 35 and partially opposite to the circumferential direction 13 to a connector 51 of the terminal area 31. In other embodiments, the wire end 41 may be guided to any suitable position within the terminal area 31 of the resolver 3.

The wiring guide members 29, as shown in FIG. 3A, each have a tilted surface 97 essentially facing away from the base 17. The tilted surface 97 of each wiring guide member 29 is oriented at an obtuse angle 99 to the corresponding supporting surface 49. During assembly of the wiring 9 and in particular during positioning of the wire end 41 at the tilted surface 97, the wire end 41 slides along the tilted surface 97 until reaching the supporting surface 49. In an embodiment, the tilted surface 97 directly merges into the supporting surface 49 at a merging region and a stop is disposed in the merging region. The stop is embodied such that the single wire 25, sliding along the tilted surface 97 towards the supporting surface 49, may be slid towards the supporting surface 49 in an unhindered manner with the wire 25 abutting the stop in order to prevent the wire 25 from being unintentionally slid from the supporting surface 49 to the tilted surface 97.

The terminal area 31, as shown in FIG. 3A, has a plurality of connector receptacles 47 for receiving, positioning, and fixing outside electric conductors, receptacle grooves 53 into which connection tabs are inserted, and a filling opening 55 through which a filling medium is inserted.

Symmetrically along the circumferential direction 13, on two opposing sides 31a, 31b of the terminal area 31 a pair of wiring guide members 29 and one auxiliary wiring guide member 27 are disposed on the base 17. As shown in FIG. 3A, a gap 57 is disposed between the two wiring guide members 29 of each pair 29a of wiring guide members 29.

Figure 3B:
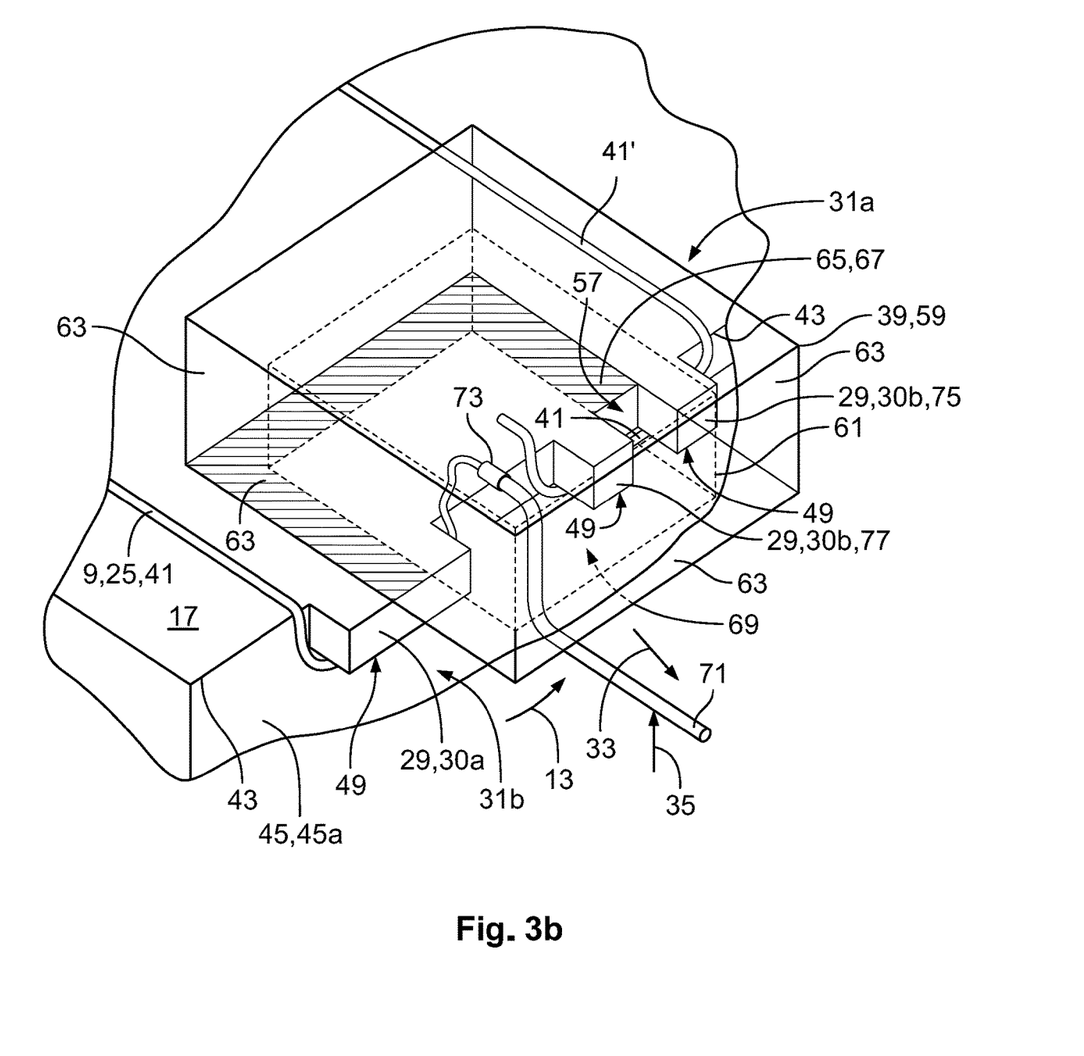
FIG. 3B is a perspective view of a terminal area of the electric device according to another embodiment with the cover.

The partial side wall 45 embodied as a planar side wall 45a, the edge 43, and a cut portion of the base 17 are shown in FIG. 3B. FIG. 3B shows two further embodiments of wiring guide members 29. A first embodiment of the wiring guide member 30a and a second embodiment of the wiring guide member 30b differ from each other in their extension essentially along the circumferential direction 13. Both embodiments of the wiring guide member 30a, 30b extend essentially along the radial direction 33 over the edge 43. The wire end 41, as shown in FIG. 3B, extends along the base 17 on the cover side 39a, around the edge 43, and is guided by a supporting surface 49 essentially along or opposite to the circumferential direction 13.

The cover 39 is indicated by a cuboid 59 including a trough section 61 in FIG. 3B. The trough section 61 opens in a direction opposite to the vertical direction 35 and the terminal area 31 is received within the trough section 61 of the cover 39. The cover 39 further comprises four trough walls 63, which abut the base 17 in sections at an abutment area 65. The abutment area 65 defines a sealing surface 67. The sealing surface 67 may be located in one single plane or may comprise steps that result from steps in the base 17; in this embodiment the trough wall 63 has depressions corresponding to the steps in the base 17 and the trough wall 63.

As shown in FIG. 3B, the supporting surface 49 of the wiring guide member 29 supports the wire 25 of the internal wiring 9 at a position spaced apart from the sealing surface 67 opposite the trough wall 63. The at least one wiring guide member 29 thus supports the wire 25 in a position in which the trough wall 63 may not touch or damage the wire 25. The supporting surface 49 and the circumferential side wall 45 of the main section 38 are oriented essentially perpendicular to each other and define a position or guided path of the internal wiring 9 for securely guiding said wiring 25 over the trough wall 63. The wire end 41 extends into the trough section 61 through a trough opening 69 and is connected to an outside electric conductor 71. A connection portion 73 between the wire end 41 and the outside electric conductor 71 is disposed completely within the trough section 61. The outside electric conductor 71 may, for instance, be used for power supply or for providing signals from the electric device 1 to further devices outside the electric device 1.

In an embodiment, the internal wiring 9 is positioned on the base 17 on the same side of the sealing surface 67 as the cover 39. The assembly and winding of the electric device 1 may thus be performed from only one side without the need for accessing the opposite side of the electric device 1, avoiding the need for a complicated winding machine for the internal wiring 9.

The auxiliary wiring guide member 27 predetermines the guiding path of the internal wiring 9 such that a redirection angle of the internal wiring 9 at the guide member 27 is approximately 90°. Such a guiding path of the internal wiring 9 prevents the internal wiring 9 from crossing the sealing surface 67 between the trough wall 63 and the base 17. The auxiliary wiring guide member 27 is a cylindrical post or pin extending from the base 17 essentially perpendicular to the sealing surface 67. The auxiliary wiring guide member 27 is positioned in a region of the base 17 which is not covered by the cover 39. The auxiliary wiring guide member 27, in an embodiment, is monolithically formed with the wiring guide member 29. The wiring guide member 29 and auxiliary wiring guide member 29 may therefore predetermine the guiding path of the internal wiring 9 and may, for instance, comprise a bend section around which the internal wiring 9 is guided.

Another wire end 41', shown in FIG. 3B, extends on one 31a of the two opposite sides 31a, 31b of the cover 39 on the base 17, is bent around the corner 43 and supported by the supporting surface 49 of the second embodiment of the wiring guide member 30b. This wire end 41', however, is supported by an outer wiring guide member 75, extends adjacent to the gap 57 between the two wiring guide elements 30b, is subsequently supported by the supporting surface 49 of an inner wiring guide element 77, and extends essentially in the vertical direction 35 through the trough opening 69 into the trough section 61. Half of the wires 41 may be guided by a first pair of wiring guide members 30a on a first side of the terminal area 31 and a second half of the wires 41' may be guided by the second pair of wiring guide members 30b on a second side of the terminal area 31. All wires of the internal wiring 9 extend over the trough walls 63 into the trough section 61 to the terminal area 31.

In further embodiments of the wiring guide members 29, the outer wiring guide members 75 and/or the inner wiring guide members 77 may additionally partially extend in the vertical direction 35, such that the inner wiring member 77 may extend into the trough section 61. Furthermore, inner and/or outer wiring guide members 75, 77 embodied that way would allow guiding of the cover 39 by the trough walls 63 guided to the gap 57 between the wiring guide members 29.

Figure 4:
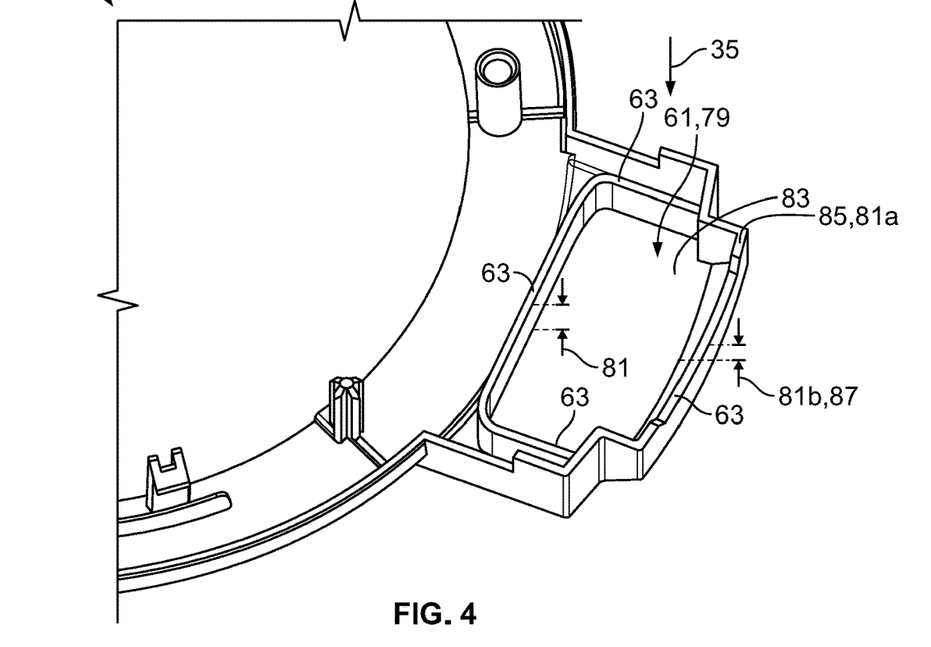
FIG. 4 is a perspective view of the cover.

The cover 39 is shown in FIG. 4. In the shown embodiment, the cover 39 is essentially ring-shaped. In other embodiments, the cover 39 may be formed to only locally cover the terminal area 31. The trough section 61 and trough walls 63, as shown in FIG. 4, define a volume 79 which is solely accessible in the vertical direction 35. A wall height 81 is measured from a trough bottom 83. The trough section 61 has wall sections 85 of increased wall height 81a, and a minimum wall height 81b determines a filling height 87. In an embodiment, the trough section 61 is filled with a filling medium up to the filling height 87. In another embodiment, if the minimum wall height 81b abuts the base 17 in the abutment area 65 as shown in FIG. 3B, the filling height 87 may exceed the minimum wall height 81b.

Figure 5:
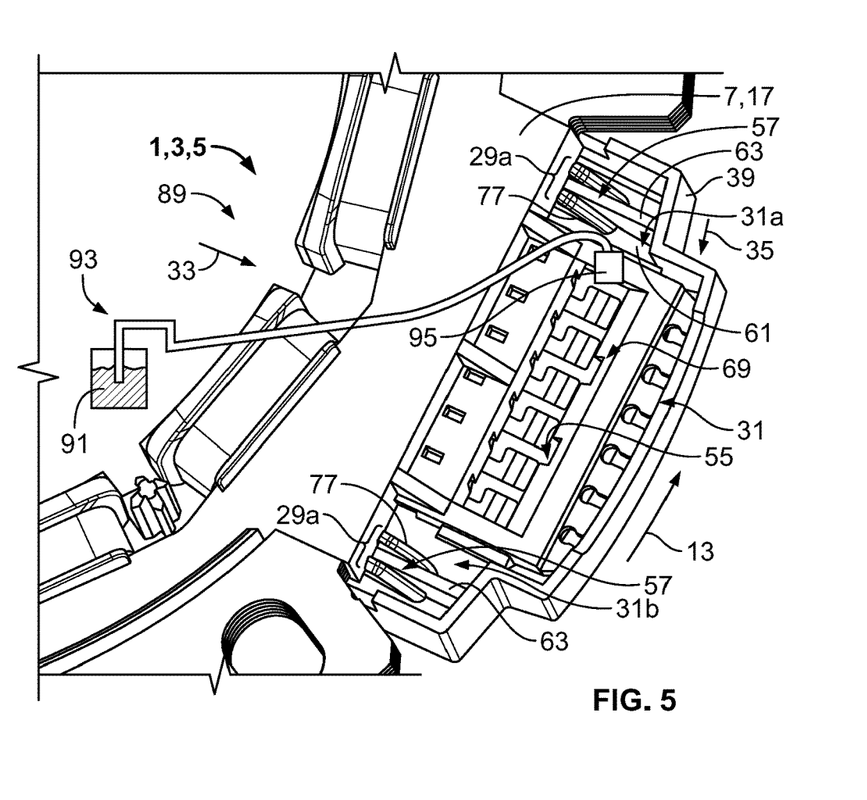
FIG. 5 is a bottom perspective view of the electric device of FIG. 1 with the cover.

As shown in FIG. 5, the cover 39 is attached to the housing 7. The trough section 61 of the cover 39 receives the terminal area 31 and, on both opposing sides 31a, 31b of the terminal area 31 at least in portions, the corresponding inner wiring guide members 77 of the pairs 29a of wiring guide members 29. The trough walls 63 on the opposing sides 31a, 31b of the trough section 61 are received in portions in the gap 57 of the corresponding pair 29a of wiring guide members 29. The position of the base 17 relative to the cover 39 is thereby determined and opposite to the circumferential direction 13. Due to the shape and/or size of the terminal section 31 and the trough section 61, the position of the cover 39 with respect to the base 17 is also determined in and/or opposite to the radial direction 33.

The resolver 3 is shown in a pre-sealed state 89 in FIG. 5 in which the base 17 and the cover 39 are only attached or mounted to each other. In the pre-sealed state 89, the terminal area 31 is protected from environmental influences by the cover 39, in particular the trough section 61. Generally, a wire insulation of the outside electric conductor 71 is removed. The regions of the wiring without insulation may be prone to corrosion and are therefore protected by being inserted into the trough section 61. This protection is effective only if the influence on the terminal area 31 is directed opposite to the vertical direction 35. Possible influences of this kind may, for instance, be solid particles moving in a direction opposite to the vertical direction 35 or mechanical stress to the resolver 3 acting along the same direction.

To protect the terminal area 31 against environmental influences such as chemical substances in the liquid or gaseous phase, in an embodiment, the trough section 61 is filled by a filling medium 91 which is inserted via the trough opening 69 and through the filling opening 55 of the terminal section 31, as shown in FIG. 5. The filling medium 91 is inserted into the trough section 61 by an appropriate filling assembly 93 providing the filling medium 91 through a nozzle 95. Filling of the trough section 61 may be performed automatically or by hand. The filling medium 91 may be a resin, as for instance an epoxy resin, which hardens after a predetermined time after mixing the epoxy resin components. Depending on the environment in which the electric device 1 will be applied, the filling medium 91 may alternatively comprise a silicone, grease, or similar material. The filling medium 91 both seals off the terminal area 31 and fixes the cover 39 to the base 17.

An electric device 1' according to another embodiment is shown in FIGS. 6-9. Like reference numbers refer to like elements and only the differences from the embodiment shown in FIGS. 1-5 will be described in detail herein. In the electric device 1', the outer wiring guide member 75 is monolithically formed in a single piece with the auxiliary wiring guide member 27 as a monolithic wiring guide member 28.

Figure 6:
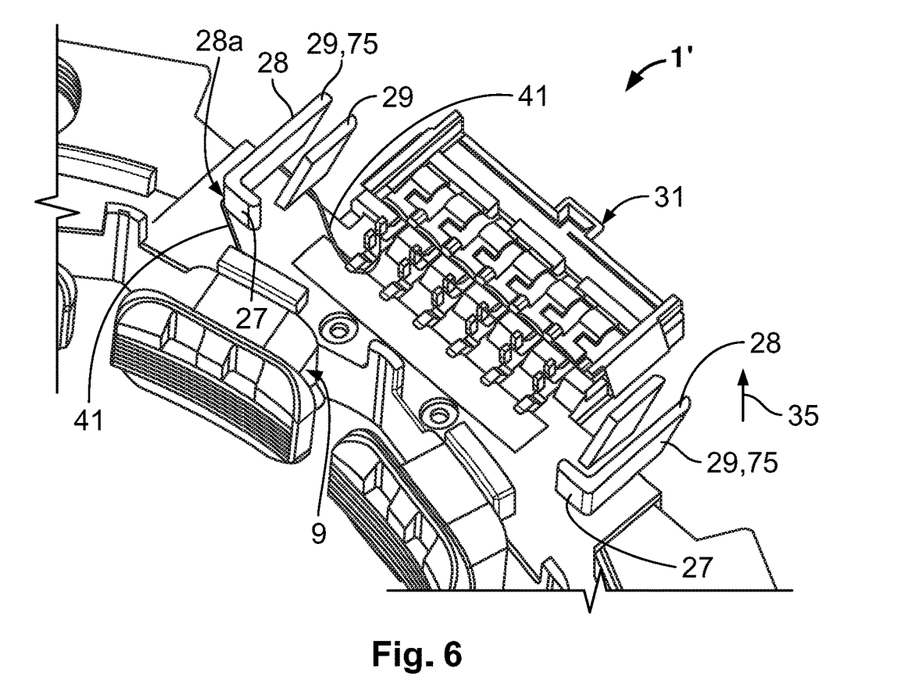
FIG. 6 is a top perspective view of a terminal area of an electric device according to another embodiment.
Figure 7:
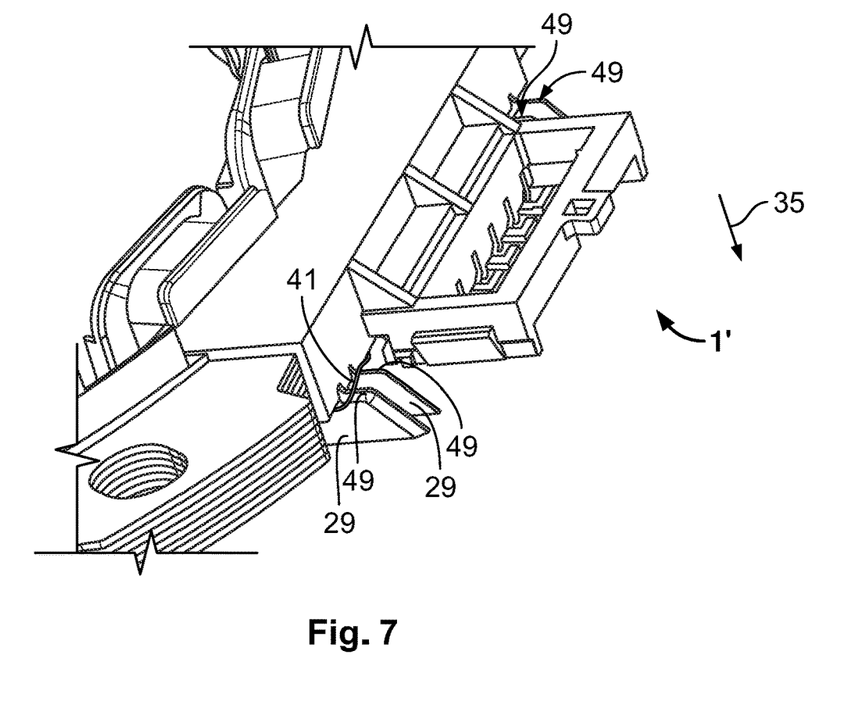
FIG. 7 is a bottom perspective view of the terminal area of the electric device of FIG. 6.

As shown in FIG. 6, the wire end 41 provided from the internal wiring 9 is guided around a corner 28a of the monolithic wiring guide member 28. Similar to the embodiment of the electric device 1 shown in FIG. 3A, the wire end 41 is guided along and below the wiring guide elements 29 and is supported by the supporting surfaces 49, as shown in FIG. 7, into the terminal area 31. As shown in FIG. 7, the wire end 41 is supported by the supporting surfaces 49 at a position located further in a direction opposite the vertical direction 35 than the abutment area 65 shown in FIG. 3B.

Figure 8:
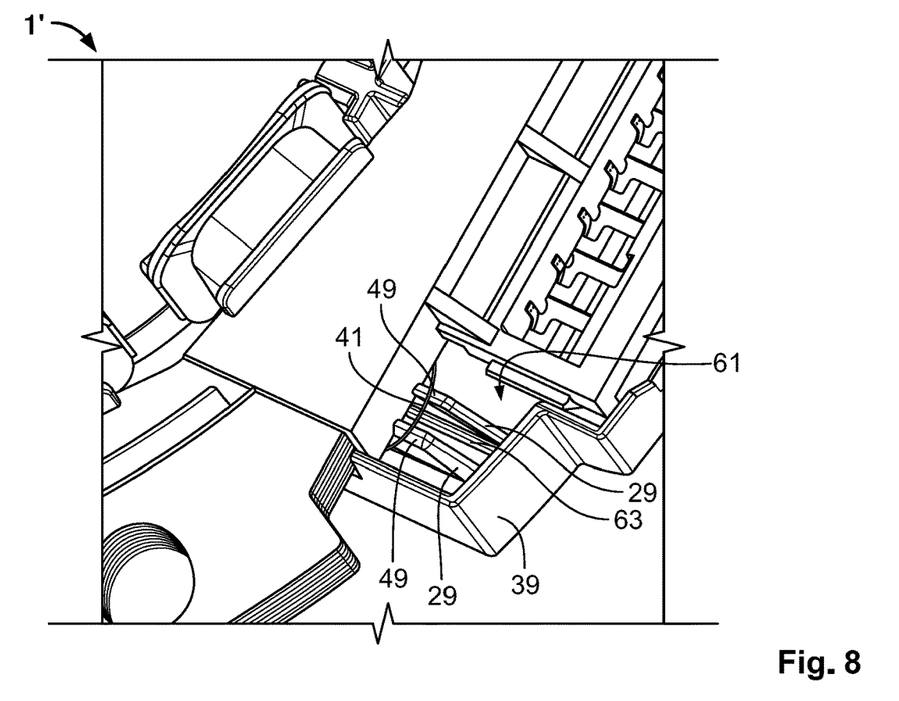
FIG. 8 is a bottom perspective view of the terminal area of the electric device of FIG. 6 with a cover.

The cover 39 is shown attached to the electric device 1' in FIG. 8. The wire end 41 is supported by the supporting surfaces 49 of the wiring guide members 29 and is spaced apart from the trough wall 63 by the supporting surfaces 49. The wire end 41 is thus lifted above the trough wall 63 and then guided into the trough section 61.

Figure 9:
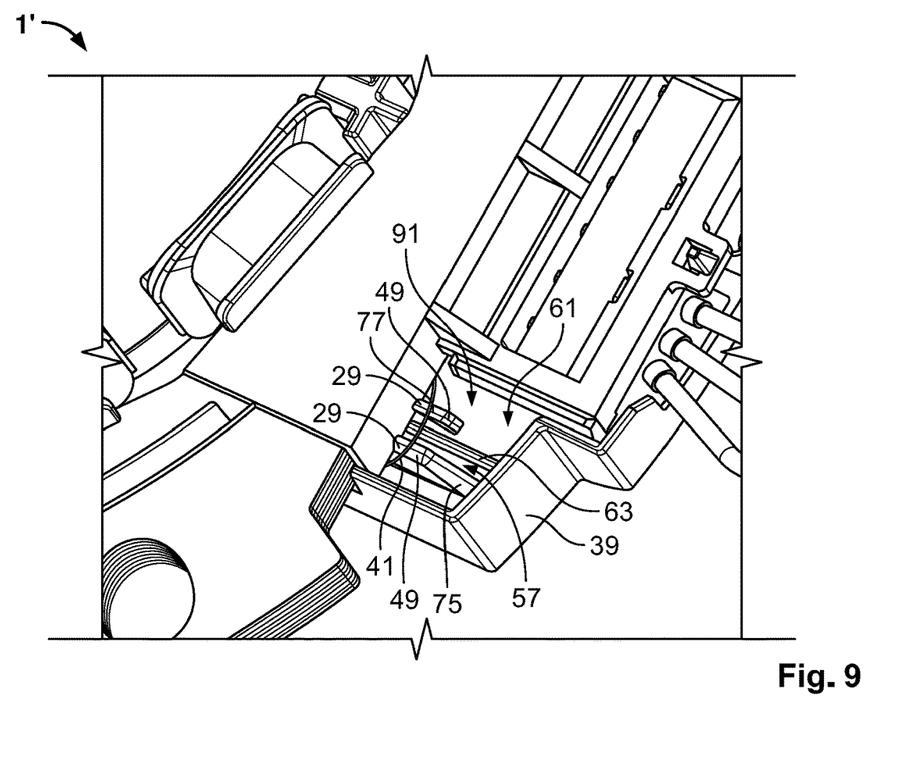
FIG. 9 is a bottom perspective view of the terminal area of the electric device of FIG. 6 with the cover and a potting.

The filling medium 91 is provided within the trough section 61 of the electric device 1' in FIG. 9. The filling medium 91 fills the trough section 61 and covers the inner wiring guide member 77 almost completely. The filling medium 91 fills the trough section 61 up to the trough wall 63 which is located in the gap 57 between the wiring guide members 29. The outer wiring guide member 75 is therefore not surrounded by the filling medium 91. The wire end 41, which is supported by the supporting surfaces 49, is guided by the wiring guide members 29 over the trough wall 63 into the trough section 61 and is therefore surrounded by the filling medium 91 within the trough section 61.

What is claimed is:

1. An electric device, comprising:
   an internal wiring; and
   a housing including
   a base having a wiring guide member and a terminal area in which the internal wiring is connected to an outside electric conductor; and
   a cover having a trough section into which the terminal area at least partly extends, the trough section having a trough wall which abuts the base to form a sealing surface, the internal wiring extending to the wiring guide member along and planar with a surface of the base that forms the sealing surface with the trough wall, the wiring guide member supporting the internal wiring at a position spaced apart from the sealing surface and opposite the trough wall, the internal wiring extending over the trough wall and into the trough section to the terminal area.

2. The electric device of claim 1, wherein the internal wiring is positioned on the base on a same side of the sealing surface as the cover.

3. The electric device of claim 1, wherein the wiring guide member is a protrusion extending away from the base toward the cover.

4. The electric device of claim 3, wherein the wiring guide member projects from a side wall of the base.

5. The electric device of claim 1, wherein the terminal area protrudes from a main section of the base.

6. The electric device of claim 5, wherein the internal wiring is disposed between a supporting surface of the wiring guide member and the main section.

7. The electric device of claim 1, wherein the wiring guide member has a tilted surface oriented at an obtuse angle with respect to the sealing surface.

8. The electric device of claim 1, wherein the base has a pair of wiring guide members with a gap disposed between the wiring guide members.

9. The electric device of claim 8, wherein the trough wall is disposed in the gap between the wiring guide members.

10. The electric device of claim 9, wherein one of the pair of wiring guide members extends into the trough section.

11. The electric device of claim 1, wherein the base has an auxiliary wiring guide member guiding the internal wiring from the base to the wiring guide member.

12. The electric device of claim 1, wherein the cover has a pair of trough walls, the trough walls disposed at opposite sides of the terminal area.

13. The electric device of claim 12, wherein the base has a pair of wiring guide members, each of the wiring guide members supporting the internal wiring at a position spaced apart from the sealing surface and opposite one of the trough walls.

14. The electric device of claim 13, wherein the base has two pairs of wiring guide members disposed at opposite sides of the terminal area.

15. The electric device of claim 6, wherein the internal wiring extends from the housing on a cover side of the sealing surface, extends parallel to the trough wall, abuts the supporting surface of the wiring guide member, and extends over the trough wall and through the sealing surface into the terminal area.

16. The electric device of claim 1, wherein the trough section is filled with a filling medium at least partially embedding the terminal area.

17. The electric device of claim 1, wherein the wiring guide member supports the internal wiring at a position aligned with the trough wall in a direction perpendicular to the sealing surface.

18. An electric device, comprising:
an internal wiring; and
a housing including
a base having a pair of wiring guide members with a gap disposed between the wiring guide members and a terminal area in which the internal wiring is connected to an outside electric conductor; and
a cover having a trough section into which the terminal area at least partly extends, the trough section having a trough wall which abuts the base to form a sealing surface, the wiring guide members supporting the internal wiring at a position spaced apart from the sealing surface and opposite the trough wall and the internal wiring extending over the trough wall and into the trough section to the terminal area, the trough wall is disposed in the gap between the wiring guide members and one of the pair of wiring guide members extends into the trough section.

* * * * *